US012029291B2

(12) United States Patent
Hynecek et al.

(10) Patent No.: US 12,029,291 B2
(45) Date of Patent: Jul. 9, 2024

(54) FOLIO FOR PERSONAL ELECTRONIC DEVICE WITH MAGNETIC WIRELESS CHARGER

(71) Applicant: Speculative Product Design, LLC, San Mateo, CA (US)

(72) Inventors: Bryan Hynecek, Redwood City, CA (US); Darrick Del Moral, San Ramon, CA (US); Scott Goard, Redwood City, CA (US)

(73) Assignee: Speculative Product Design, LLC, San Mateo, CA (US)

( * ) Notice: Subject to any disclaimer, the term of this patent is extended or adjusted under 35 U.S.C. 154(b) by 111 days.

(21) Appl. No.: 17/960,610

(22) Filed: Oct. 5, 2022

(65) Prior Publication Data

US 2023/0115632 A1 Apr. 13, 2023

Related U.S. Application Data

(60) Provisional application No. 63/253,464, filed on Oct. 7, 2021.

(51) Int. Cl.

| | |
|---|---|
| ***A45C 11/00*** | (2006.01) |
| ***A45C 13/00*** | (2006.01) |
| ***A45C 15/00*** | (2006.01) |
| ***H02J 50/10*** | (2016.01) |

(52) U.S. Cl.

CPC ............ *A45C 11/00* (2013.01); *A45C 13/005* (2013.01); *A45C 15/00* (2013.01); *H02J 50/10* (2016.02); *A45C 2011/002* (2013.01); *A45C 2011/003* (2013.01)

(58) Field of Classification Search

CPC .................. A45V 11/00; A45V 13/005; A45V 2011/002; A45V 2011/003; A45V 15/00; H02J 50/10

USPC ......................... 206/320, 576, 701, 703, 722

See application file for complete search history.

(56) References Cited

U.S. PATENT DOCUMENTS

| | | | | |
|---|---|---|---|---|
| 11,903,467 | B1 * | 2/2024 | Hynecek | A45C 13/1069 |
| 2021/0052053 | A1 * | 2/2021 | Roberts | G06F 1/1607 |
| 2023/0096345 | A1 * | 3/2023 | Lewis | H04B 1/3888 361/688 |
| 2023/0157430 | A1 * | 5/2023 | Backus | A45C 13/005 150/149 |
| 2023/0198301 | A1 * | 6/2023 | Peters | H04M 1/185 320/108 |
| 2023/0389684 | A1 * | 12/2023 | Guan | A45F 5/10 |

* cited by examiner

*Primary Examiner* — Jacob K Ackun

(74) *Attorney, Agent, or Firm* — HILL, KERTSCHER & WHARTON, LLP; Gregory T. Ourada

(57) ABSTRACT

A protective cover and mount for a personal electronic device that is capable of using a wireless charging system comprising a wireless charger and a power cord having a plug. The protective cover features a cavity recessed into underlying structure. The cavity is shaped to accommodate the wireless charger, and the underlying structure is shaped so that power cords connected to the wireless charger can be conveniently managed.

6 Claims, 10 Drawing Sheets

2

FOLIO FOR PERSONAL ELECTRONIC DEVICE WITH MAGNETIC WIRELESS CHARGER

FIELD OF THE INVENTION

The field of the invention is personal electronic device accessories, specifically, protective folios, cases, or covers for personal electronic devices, e.g. tablet computing devices and smartphones.

BACKGROUND

Because modern personal electronic devices are expensive, portable, have certain elements that are easily damaged (e.g. the screen), and are constantly at risk of being dropped, accessories have been developed which are designed to protect such devices.

Such accessories are typically constructed of flexible materials such as fabric, polymer, polymer-coated fabric, polymer-based fabrics and leather (either real or artificial). Usually, these accessories have an internal structure of rigid or semi-rigid impact absorbing and protective material that is covered by the aforementioned flexible materials. This not only provides optimal protection for the personal electronic device, but also allows for customization, and flexibility in construction. Additionally, the flexible materials usually function as hinging materials, which for example allow the cover of a case or folio to open or close.

Personal electronic devices using inductive chargers incorporating magnetic attachment mechanisms are increasingly being used in the marketplace. These chargers perform a dual function of charging a device and also provide a magnetic mechanism for securely attaching the personal electronic device to a stand, laptop, etc. However, the shape of these chargers and the presence of a power cord presents challenges to efficiently and neatly accommodating both while being able to use the personal electronic device.

It is therefore desirable to have an accessory which protects the device and accommodates such charging mechanisms in a way that takes advantage of the attachment features of these charging mechanisms.

SUMMARY

The current embodiments of the invention describe a case for a charging device or implement for mobile devices that protects the charging device or implement while simultaneously making the charging device or implement easier to transport. Embodiments of the case allow the personal electronic device to be charged while the charging device is still installed in the case, and these embodiments include features that enhance the use of the mobile device. Preferred embodiments of the case include a body and a cover. In these embodiments, the body provides form-fit storage for the charging device, including any associated charging cables. In certain embodiments, the form-fit storage includes structures to facilitate wrapping cables. One preferred embodiment of the folio includes a circular cutout lined with pliable foam or elastomeric material which accommodates the charging device.

DETAILED DESCRIPTION OF PREFERRED EMBODIMENTS

The invention is described in preferred embodiments in the following description with reference to the FIGS., in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
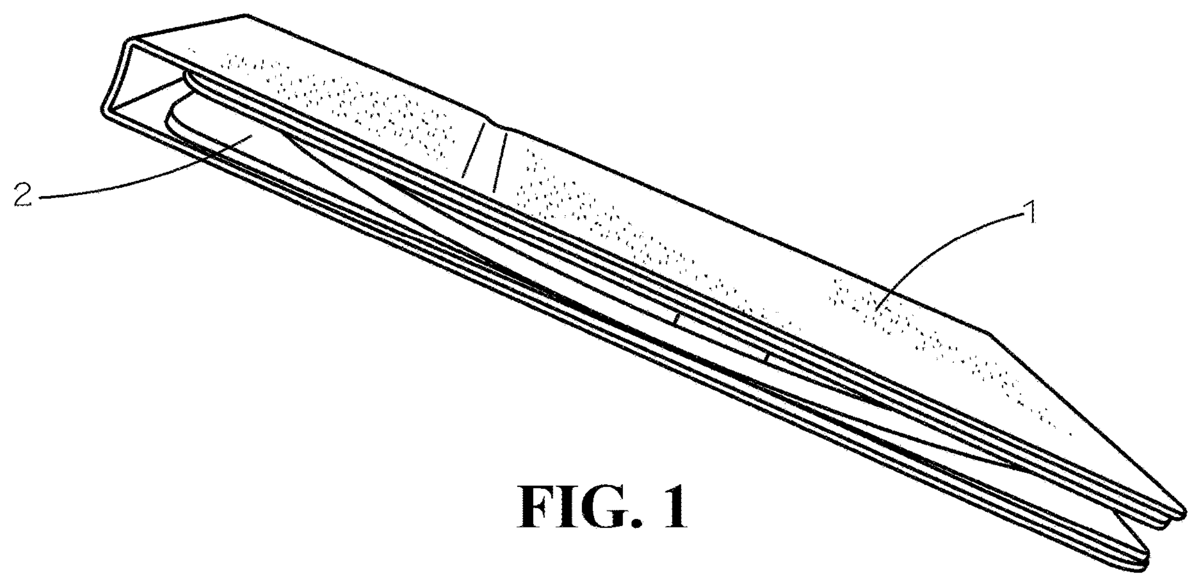
FIG. 1 is side perspective view of an embodiment in the closed configuration.
Figure 2:
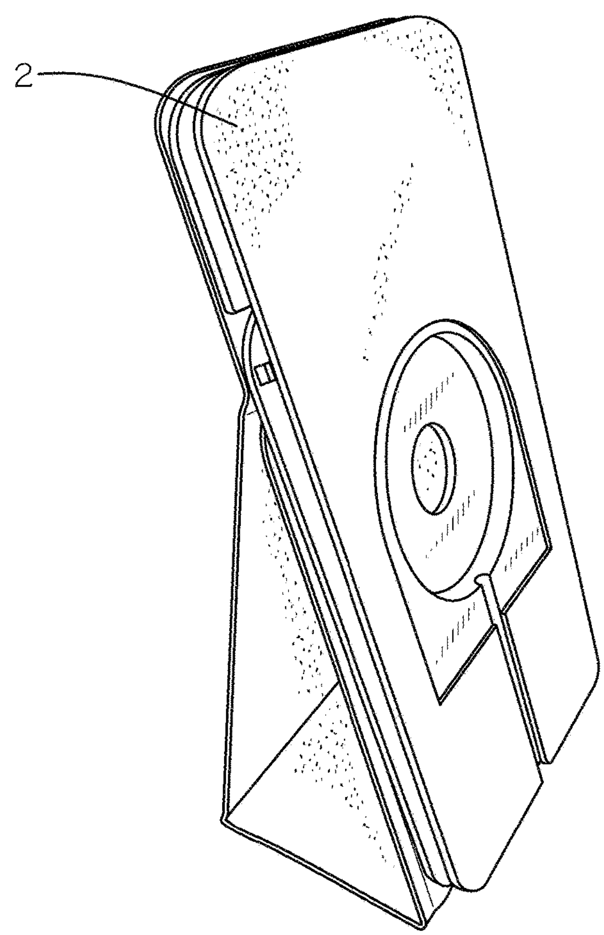
FIG. 2 is a side perspective view of an embodiment with attached personal electronic device and charging mechanism in a fixed-tilt viewing configuration.
Figure 3:
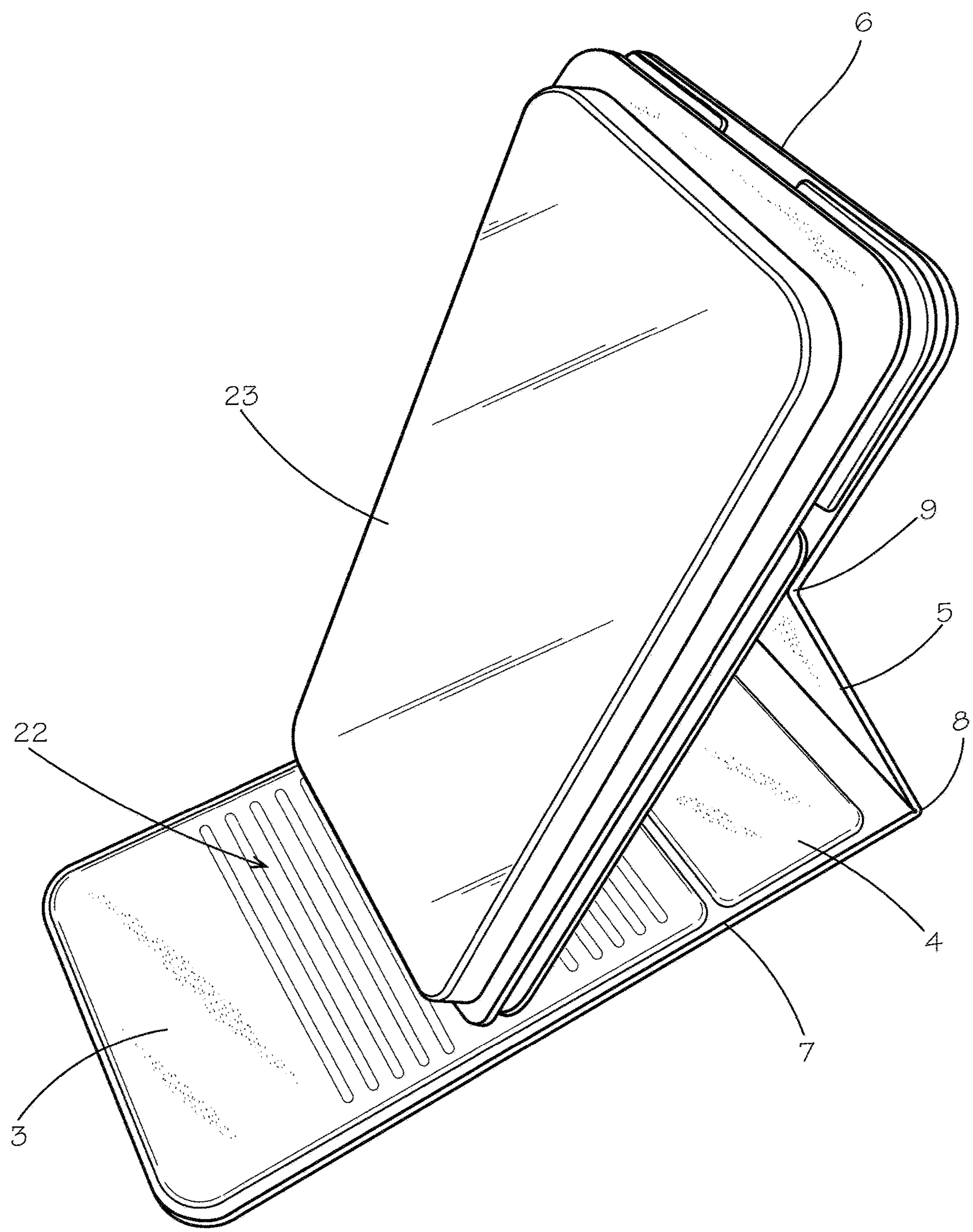
FIG. 3 illustrates an embodiment in a variable-tilt viewing configuration.

FIG. 1 illustrates one embodiment of the case showing cover 1, which is affixed to and surrounds housing 2. Cover 1 in this embodiment can be constructed of a variety of flexible materials such as fabric, polymer, polymer-coated fabric, or leather. The internal structure of cover 1 are plates of either a rigid or semi-rigid material that is surrounded by the aforementioned flexible material, as will be discussed in more detail below. Housing 2 in this embodiment is constructed of a substantially rigid material. Typically, this material comprising the internal structure of cover 1 and housing 2 is fiberglass, polypropylene, or polycarbonate, although other suitably rigid materials may be used. The underlying rigid material is encased in a soft material such as felt or a synthetic microfiber or microsuede material typically consisting of a polyester or a polyester blend. The soft covering material is typically affixed to the underlying housing using an appropriate adhesive, either a thin painted-on adhesive, or a hot-melt adhesive that is die cut from a sheet. FIGS. 2 and 3 illustrate different configurations of cover 1 that permit different viewing arrangements. FIG. 2 illustrates a fixed-tilt viewing configuration, while FIG. 3 illustrates a variable-tilt viewing configuration.

Figure 4:
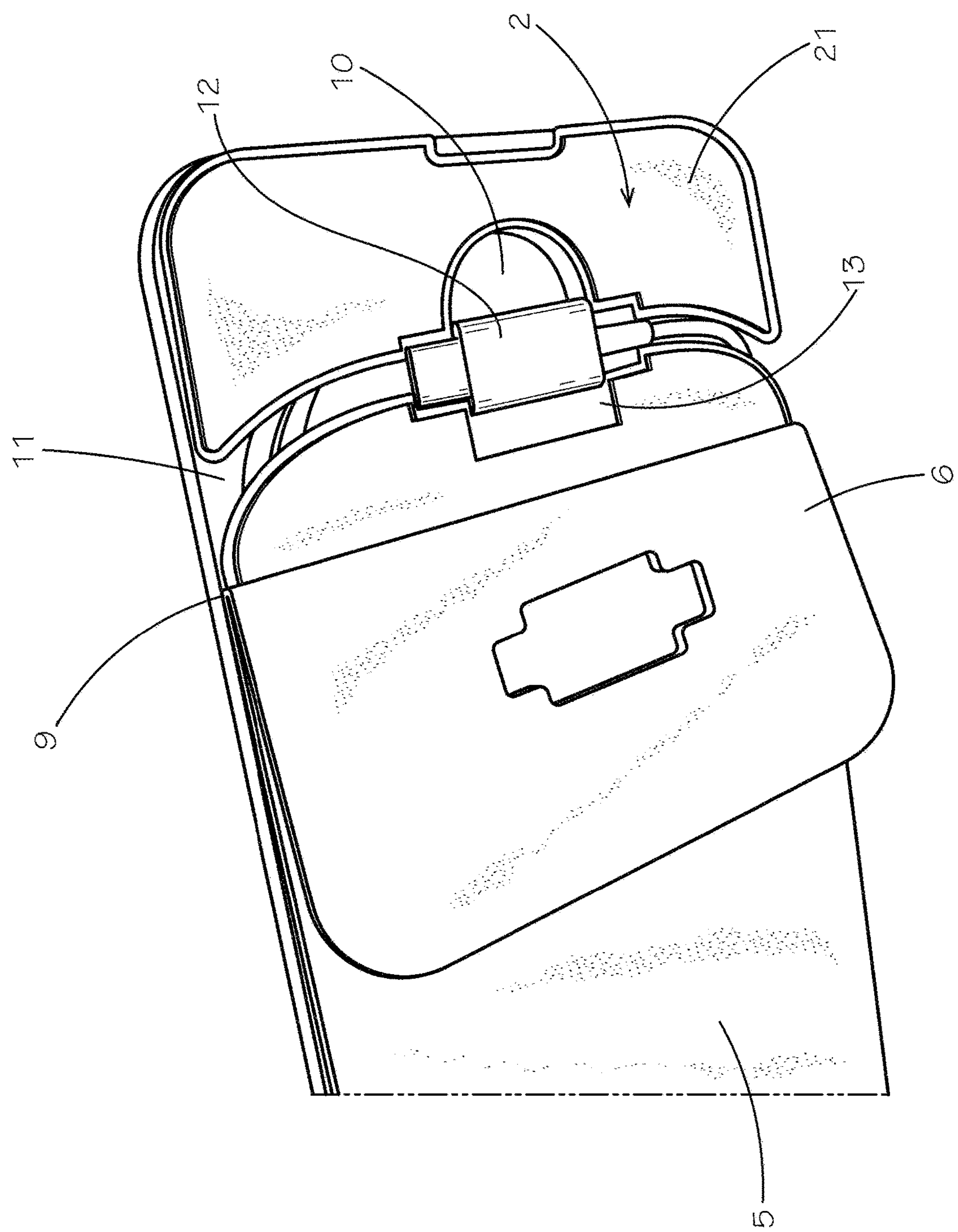
FIG. 4 illustrates an embodiment having a covered recess for the charging plug.
Figure 11:
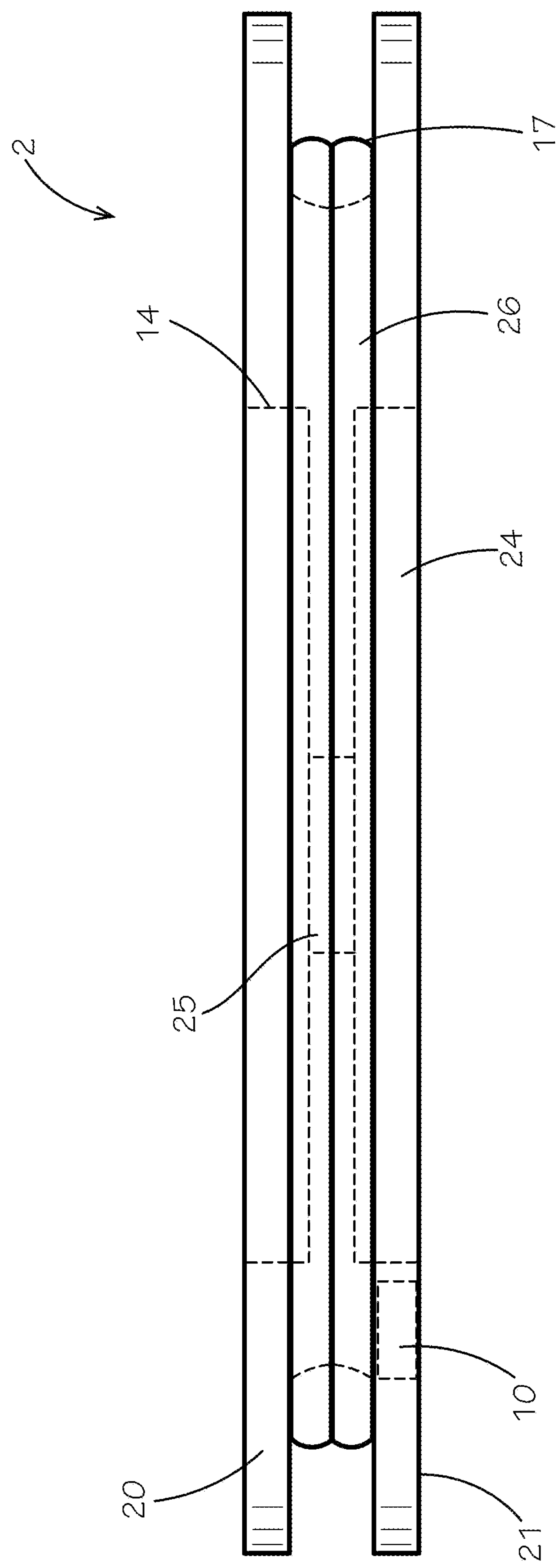
FIG. 11 is a left side elevation view of one embodiment of the housing.
Figure 12:
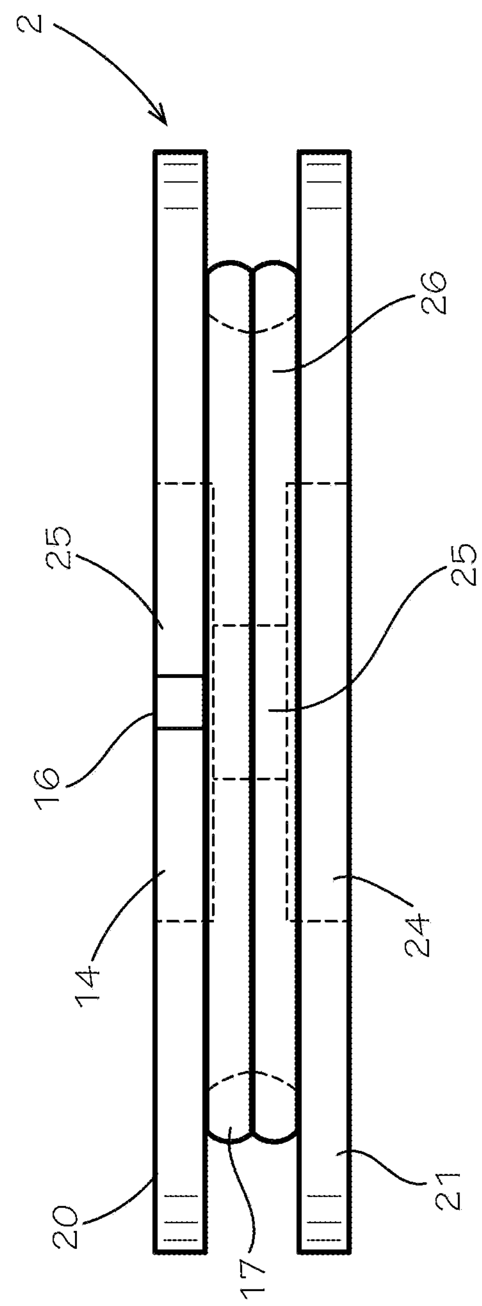
FIG. 12 is a bottom elevation view of one embodiment of the housing.

As illustrated in FIGS. 3 and 4, cover 1 incorporates multiple structural plates 3, 4, 5, 6. Structural plates 3, 4, 5, 6 are comprised of a rigid or semi-rigid material such as fiberglass, polypropylene, or polycarbonate board, and provide structural stability to the cover. Structural plates 3, 4, 5, 6 are covered in flexible fabric material; the gaps between these structural plates define flexible hinges 7, 8, 9, which in the disclosed embodiment are take advantage of the flexibility of the fabric surrounding the structural plates. As illustrated in FIG. 4, hinge 9 is attached to housing 2 and joins structural plates 5 and 6. In these embodiments, the cover material is stitched to the line fabric that is then adhered to housing 2. FIG. 4 also illustrates that structural plate 6 covers a plug recess 10, which is disposed in the upper half of the rear side 21 of housing 2. Plug recess 10 is aligned with, and forms part of interior cable channel 11. FIG. 3 shows that structural plate 6 covers plug recess 10 and interior cable channel 11 in a first configuration, and permits access to the personal electronic device plug 12 in the second configuration illustrated in FIG. 4. In the embodiment shown in FIG. 4, personal electronic device plug 12 fits into plug recess 10 and is held securely therein by retaining tab 13. Retaining tab 13 is constructed at least partially of an elastomeric material permitting personal electronic device plug 12 to be held securely yet removed quickly when needed. Interior cable channel 11 is located between front side 20 and rear side 21 and is defined by interior support 26. As illustrated in FIGS. 11 and 12, the sides of interior support 26 between front side 20 and rear side 21 are concave or knurled to facilitate wrapping power cable 17 around the perimeter of interior support 26.

Figure 5:
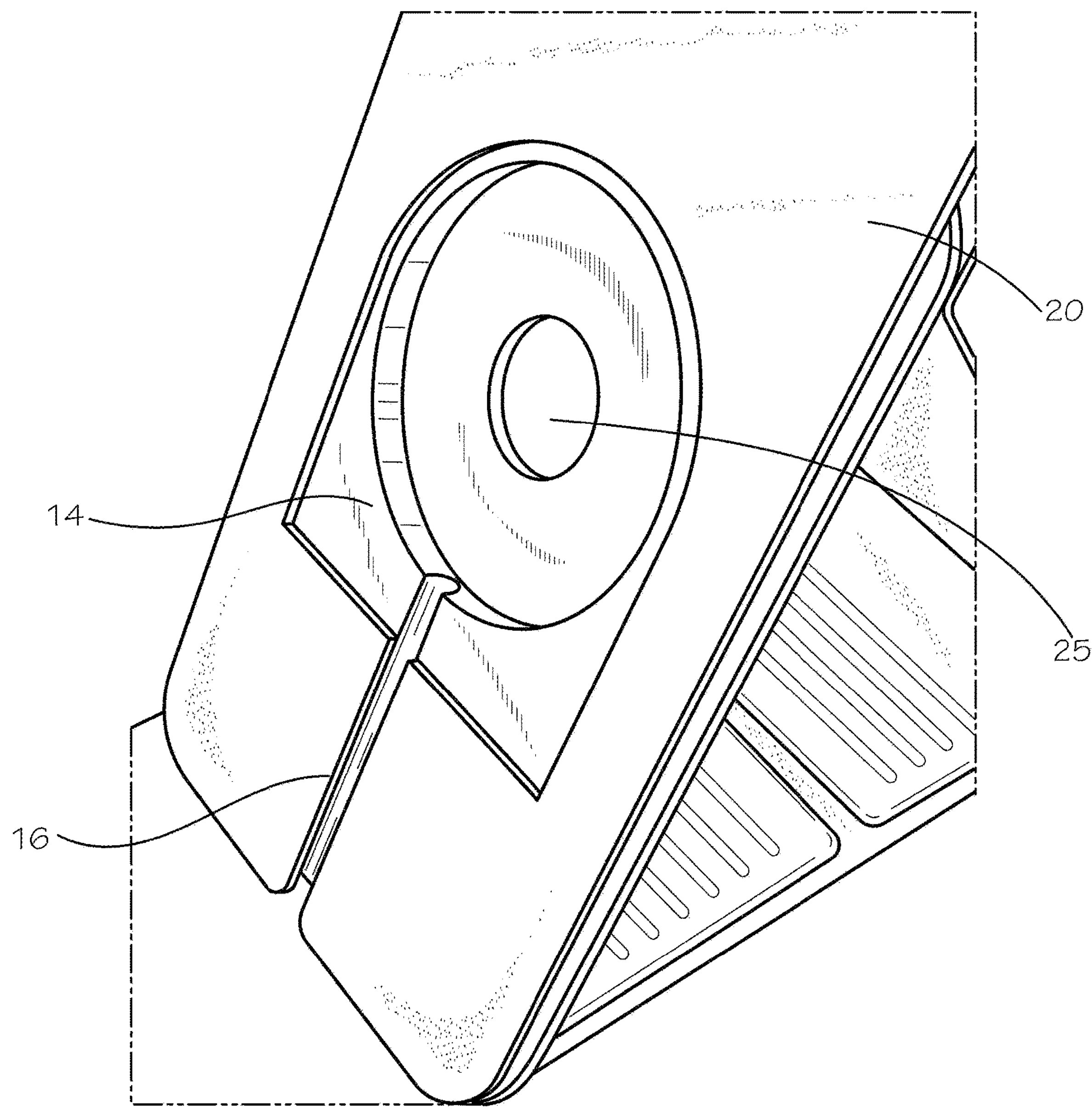
FIG. 5 is a perspective view of an embodiment illustrating the charging device recess.
Figure 7:
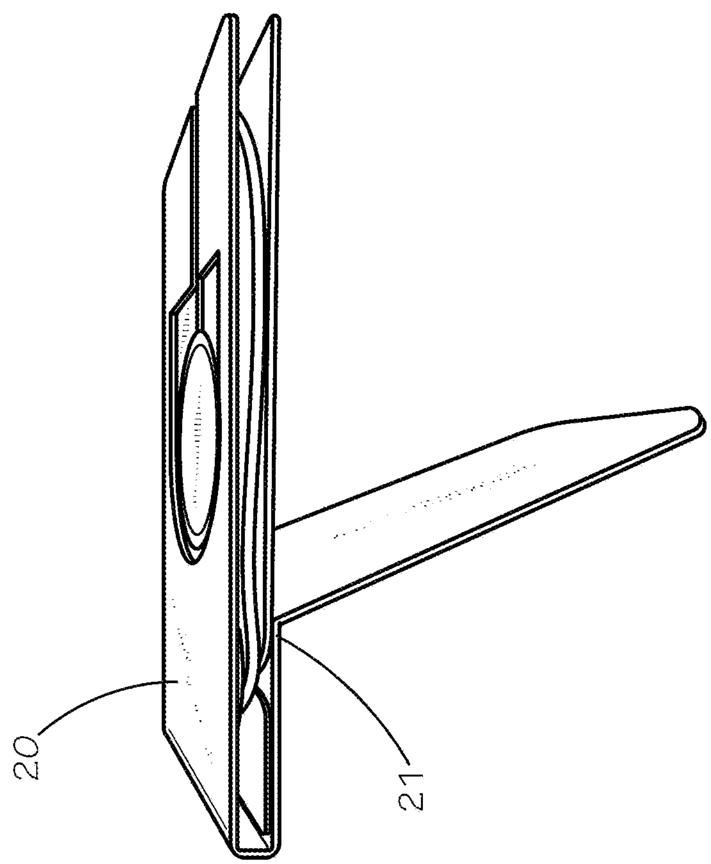
FIG. 7 is a side view of the charging device recess and cable channel according to one embodiment.
Figure 6:
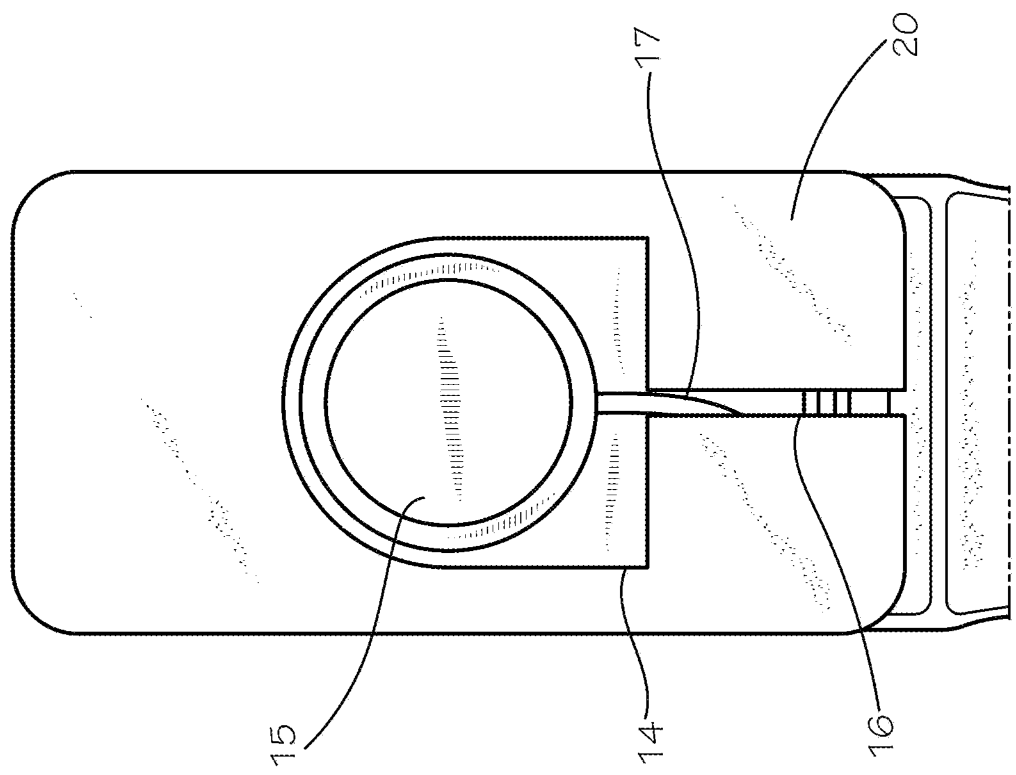
FIG. 6 illustrates a front view of the charging device recess according to one embodiment.
Figure 8:
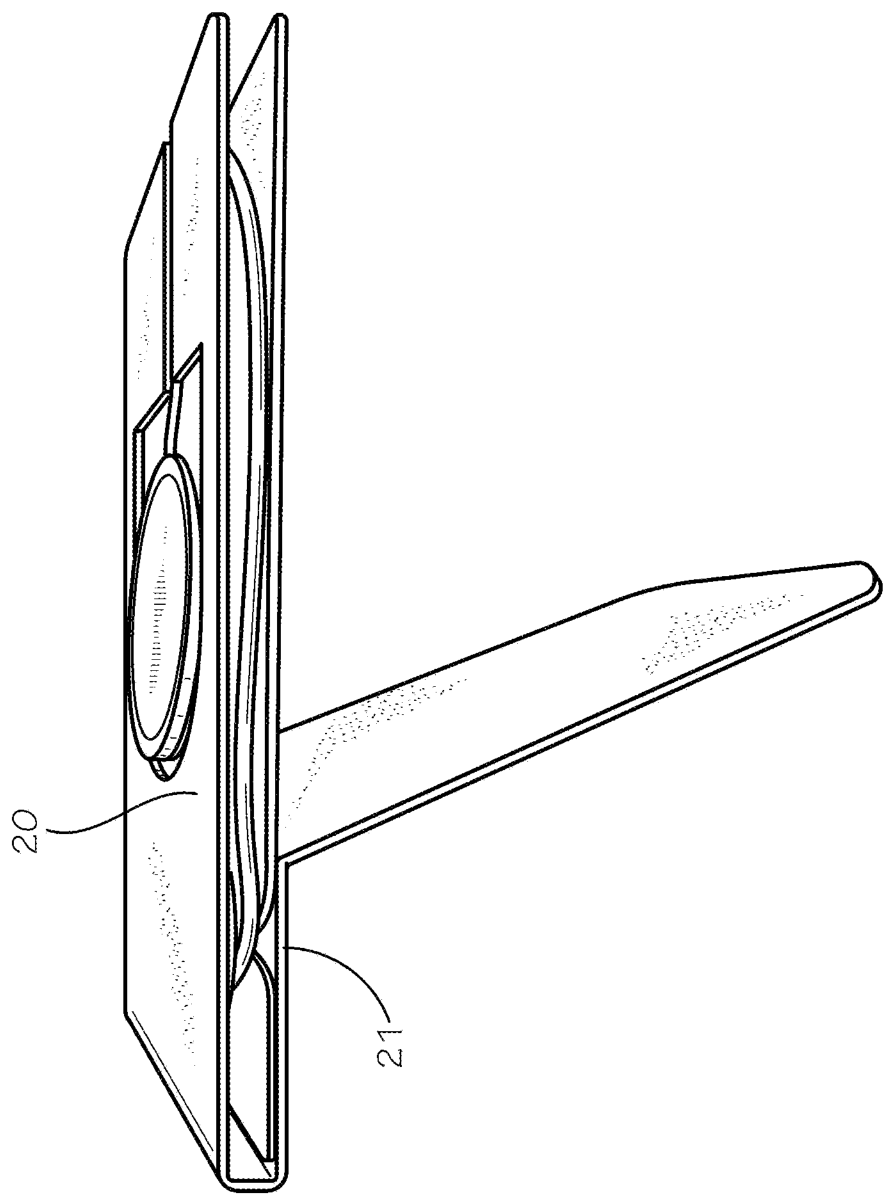
FIG. 8 is a side view of the protective case illustrating the adjustability of the charging device recess.
Figure 9:
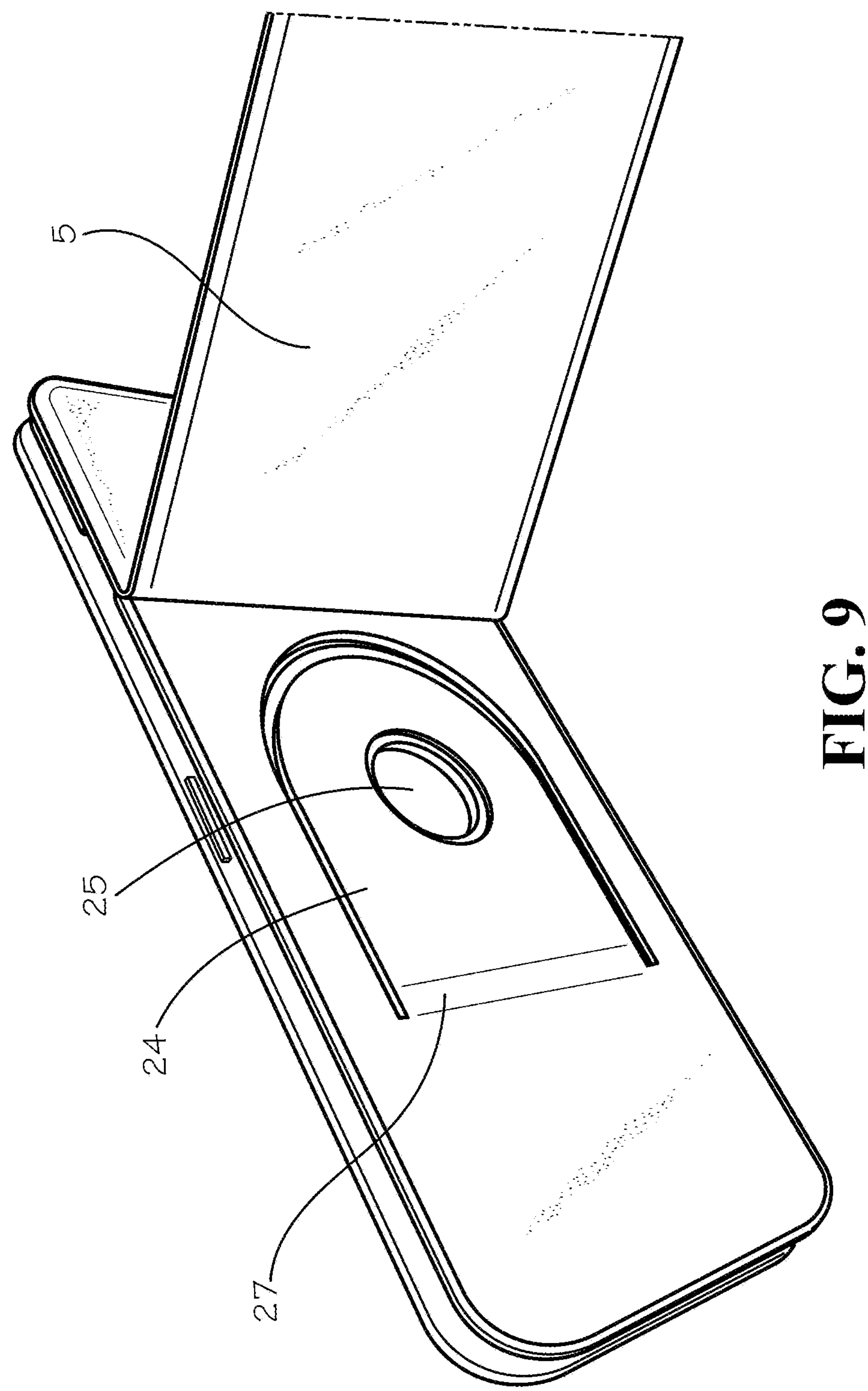
FIG. 9 is a photograph showing an indentation and finger hole in a rear side of an embodiment.
Figure 10:
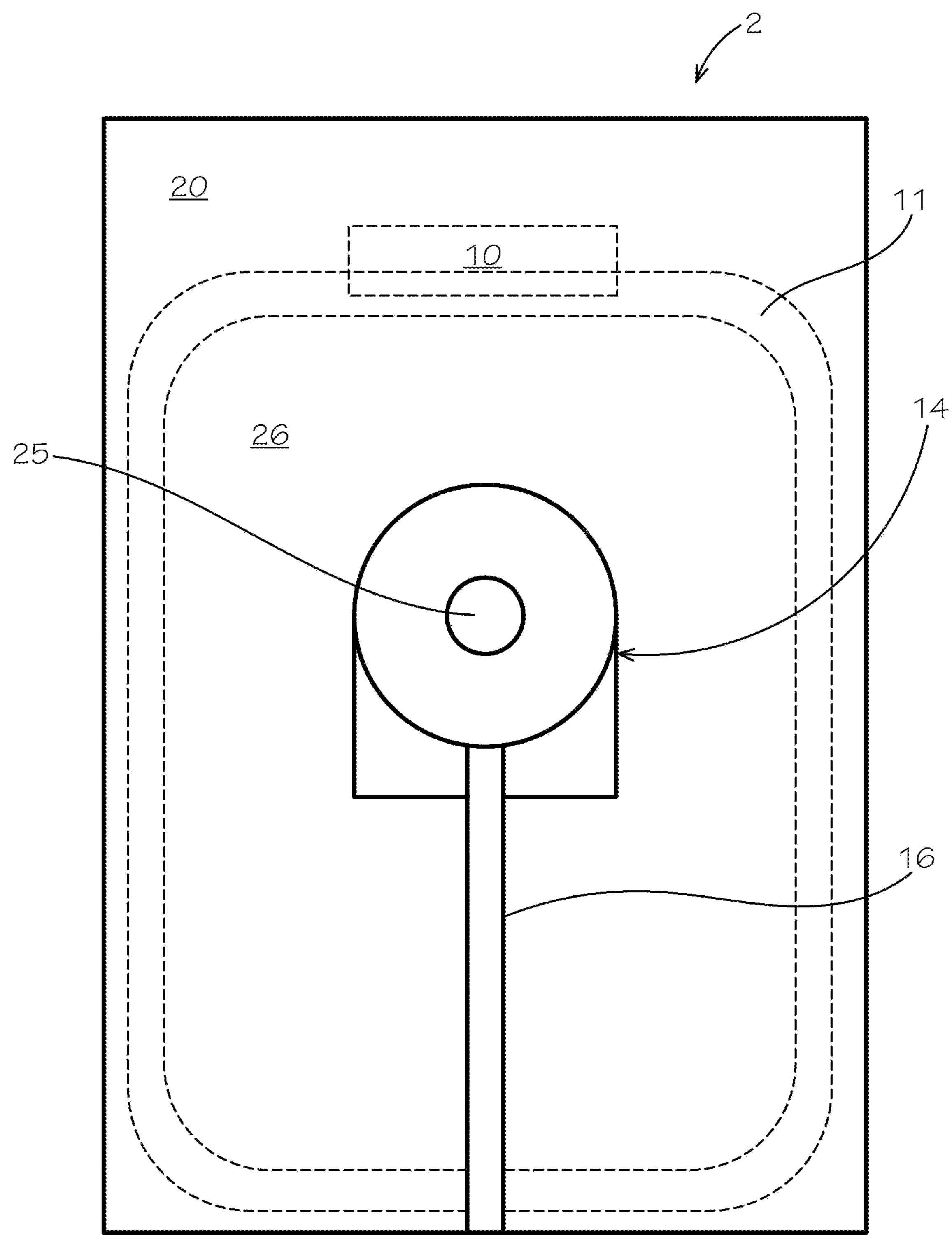
FIG. 10 is an overhead plan view illustrating the front side and interior structure of the case according to one embodiment.

FIGS. 5, 6, and 10 illustrate the front side 20 and side of housing 2, which contains a mounting recess 14 which is shaped to accommodate magnetic wireless charger 15 and power cord 17. Notch 16 extends through mounting recess 14 and the front side 20 and allows the cable to pass through the front side 20 thence to interior cable channel 11. Mounting recess 14 is constructed in certain embodiments of a rigid substrate such as polycarbonate, nylon, ABS, or a glass-filled variant, overmolded with a soft material such as TPU, TPE, or silicone, which provides a form fit for the wireless charger. Mounting recess 14 is attached at its bottom linear edge using the fabric cover, which forms a flexible linear hinge 27, as illustrated in FIG. 9. The overall tombstone shape of mounting recess 14 results because the magnetic wireless charger 15 is round. However, if mounting recess 14 were round, the lower flexible hinge would be impracticably narrow and subject to premature failure after repeated use. Therefore, the bottom linear edge of mounting recess 14 is to accommodate a longer hinge 27. In certain embodiments, mounting recess 14 also has retaining tabs on the arched top that keep it from overextending, i.e. popping out of the hole in which it resides. As shown in FIGS. 7, 8, and 9, rear side 21, contains an indentation 24 with a finger hole 25 which allows mounting recess 14 to be pushed using a finger slightly outwardly from the front side 20 as shown in FIG. 8. This allows the installed magnetic wireless charger 15 to meet the back of a personal electronic device 16 which may have protruding cameras on its rear side which would otherwise prevent the personal electronic device from sitting fully flush with front side 20. In certain embodiments, front side 20 may also have a separate cavity to accommodate a protruding camera.

Personal electronic device 23 is designed so that only a specified rear portion of the device will engage the magnetic wireless charger 15. Therefore, mounting recess 14 must be positioned in the housing according to the specific design of personal electronic device 23, so that when the device is attached, the top and bottom edges of personal electronic device 23 align with the top and bottom edges of housing 2 as shown in FIG. 3.

FIGS. 6, 7, and 11 illustrate a side view of housing 2, including front side 20 and rear side 21, while FIG. 12 illustrates a bottom plan view of housing 2. Front side 20 and rear side 21 are joined by interior support 26. Power cord 17 may be wrapped around interior support 26 which allows the free end of power cord 17 having the personal electronic device plug 12 to be held securely by plug recess 10, while the other end is secured when magnetic wireless charger 15 is inserted into mounting recess 14. An opening in rear side 21 extending toward front side 20 facilitates detachment of magnetic wireless charger 15 from mounting recess 14.

Referring again to FIG. 3, one side of structural plate 3 comprising cover 1 has a series of parallel grooves 22 configured to accommodate the lower edge of rear side 21 of housing 2. When cover 1 is folded into the configuration shown, structural plates 3 and 4 provide a base, and structural plate 5 functions as a supporting member. It should also be appreciated that the lengths of structural plates 3 and 4 in the disclosed embodiment approximately equal the lengths of structural plates 5 and 6, less the width of hinges 7 and 9, respectively. Furthermore, the length of hinge 8 is equal to or greater than to the thickness of housing 2, which is the sum of the thicknesses of front side 20, rear side 21, and the interior support 26.

The embodiments disclosed herein are used by first opening cover 1 and inserting magnetic wireless charger 15 into mounting recess 14 until it is secure with the proximal end of power cord 17 placed into hinge 16, passing it into interior cable channel 11, wrapping any excess power cord around the perimeter of interior support 26. The distal end of power cord 17 can then be plugged into a power receptable or secured in plug recess 10 using retaining tab 13, as shown in FIG. 4. Structural plate 6 then covers plug recess 10. Personal electronic device 23 is then attached by aligning the appropriate rear portion of the device with the magnetic wireless charger 15 until it magnetically attaches to the inductive charger.

To use the personal electronic device, cover 1 is configured as shown in FIG. 2 or 3. FIG. 2 illustrates a fixed-tilt viewing mode, wherein structural plates 5 and 6 provide support for rear side 21, while structural plates 3 is folded inwardly about hinge 7 so that structural plate 3 is parallel to and in contact with rear side 21 and the free upper edge of structural plate 3 is in contact with hinge 9 and rear side 21. For the variable-tilt viewing configuration illustrated in FIG. 3, the bottom edge of housing 2 is insertable into one of the plurality of parallel grooves 22. As shown in FIG. 2, charging cord can be unwound from the interior support and plug 12 may be inserted into an appropriate AC/DC inverter to effectuate charging of personal electronic device 23.

It is noted that the terminology used above is for the purpose of reference only, and is not intended to be limiting. For example, terms such as "upper," "lower," "above," "below," "rightward," "leftward," "clockwise," and "counterclockwise" refer to directions in the drawings to which reference is made. As another example, terms such as “inward” and “outward” may refer to directions toward and away from, respectively, the geometric center of the component described. As a further example, terms such as “front,” “rear,” “side,” “left side,” “right side,” “top,” “bottom,” “inner,” “outer,” “horizontal,” and “vertical” describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Indeed, the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally. Moreover, the disclosure set forth herein includes the mirror image, i.e., mirror configuration, taken from any perspective of any drawing or other configuration shown or described herein. Accordingly, the preferred embodiments of the invention as set forth above are intended to be illustrative, not limiting. Various changes may be made without departing from the spirit and scope of the inventions as defined in the following claims.

What is claimed is:

1. An apparatus adapted for use with a wireless charging appliance comprising at least one attachment magnet disposed in an appliance housing and a power cord comprising a plug, wherein the power cord is attached to the appliance housing, the apparatus comprising:

- a housing comprising:
  - a front side;
  - a rear side comprising a plug recess;
  - an interior cable channel disposed around a perimeter of an interior support joining the front side and the rear side;
  - a hole disposed through the front side, the interior support, and the rear side, the hole having a first opening in the front side and a second opening in the rear side;
  - a first notch segment disposed in the front side, the first notch segment extending from a bottom edge of the first opening to a bottom edge of the front side, wherein the first notch segment comprises an access to the interior cable channel;
- a mounting recess disposed in the hole, comprising an upper side corresponding to the front side, a cavity in the upper side adapted to accommodate a shape of the wireless charging appliance, a linear bottom edge, a retaining tab which is adapted to engage an edge of the first opening and the second opening, and a second notch segment having a first end conjoined with a first end of the first notch segment, wherein the linear bottom edge hingedly engages a bottom edge of the hole, such that a top edge of the mounting recess is adapted to extend outwardly beyond the first opening; and
- a cover attached to the rear side, the cover comprising a plurality of structural plates joined by one or more hinges.

2. The apparatus of claim 1, wherein the plurality of structural plates joined by one or more hinges comprise: a first structural plate; a second structural plate; a third structural plate; and a fourth structural plate; a first hinge connecting the first structural plate and the second structural plate; a second hinge connecting the second structural plate and the third structural plate; and a third hinge connecting the third structural plate and the fourth structural plate.

3. The apparatus of claim 2, wherein the cover is attached to the rear side at the third hinge.

4. The apparatus of claim 3, wherein the fourth structural plate is disposed above the plug recess when in a closed position.

5. The apparatus of claim 2, wherein the first structural plate comprises a plurality of parallel grooves disposed on a first side, wherein the plurality of parallel grooves are adapted to accommodate a lower edge of the rear side of the housing.

6. The apparatus of claim 1, wherein the mounting recess further comprises a finger hole in a bottom of the cavity such that a portion of the appliance housing is accessible from the rear side of the housing.

* * * * *